United States Patent [19]

Bainard

[11] 4,159,298
[45] Jun. 26, 1979

[54] METHOD FOR MAKING A SHAFT SEAL

[75] Inventor: Dean R. Bainard, Bethel Township, York County, S.C.

[73] Assignee: Garlock Inc., Palmyra, N.Y.

[21] Appl. No.: 764,965

[22] Filed: Feb. 2, 1977

Related U.S. Application Data

[63] Continuation of Ser. No. 576,666, May 12, 1975, abandoned.

[51] Int. Cl.² .................. B29D 3/00; B29D 23/01; B29G 3/00; B29H 9/10
[52] U.S. Cl. .................. 264/163; 29/527.1; 264/262; 264/263; 264/266; 264/268; 264/277; 425/DIG. 47
[58] Field of Search .............. 264/268, 127, 262, 266, 264/263, 163; 425/DIG. 47; 29/527.1, 460; 277/151, 152, 153

[56] References Cited

U.S. PATENT DOCUMENTS

| 2,804,324 | 8/1957 | Stallings | 277/153 |
| 3,276,115 | 10/1966 | Hansz | 29/527.1 |
| 3,493,645 | 2/1970 | Sanderson et al. | 264/161 |
| 3,851,037 | 11/1974 | Day et al. | 264/268 |
| 3,875,654 | 4/1975 | Ushijima | 264/268 |
| 4,038,359 | 7/1977 | Pendleton | 264/268 |

Primary Examiner—James B. Lowe
Attorney, Agent, or Firm—Schovee & Boston

[57] ABSTRACT

A method for making a shaft seal of the type including an elastomeric body and a polytetrafluoroethylene sealing element comprising inserting a metal shell (if employed in the seal), a synthetic rubber blank prep form and a polytetrafluoroethylene sealing element into a transfer or compression mold, and then closing the mold to simultaneously form a sealing lip portion of the polytetrafluoroethylene sealing element into the desired shape, mold the rubber into the desired shape and bond the rubber to the shell (if used) and to the anchor portion of the polytetrafluoroethylene sealing element.

31 Claims, 4 Drawing Figures

METHOD FOR MAKING A SHAFT SEAL

CROSS REFERENCE TO RELATED APPLICATION

This application is a continuation of my application Ser. No. 576,666, filed May 12, 1975 and entitled "METHOD OF MAKING A SHAFT SEAL" and now abandoned.

BACKGROUND OF THE INVENTION

1. Field of the Invention

This invention relates to shaft seals, also known as oil seals, designed for sealing against fluid leakage along shafts such as engine crankshafts and motor vehicle drive transmission shafts, and in a preferred embodiment to shaft seals of the type including a polytetrafluoroethylene sealing element.

2. Description of the Prior Art

Prior art techniques required a forming operation, after molding the seal, to form the polytetrafluoroethylene sealing lip into the desired shape. This later forming operation required additional time, handling, and expense, and if not done perfectly, could result in a seal I.D. that was not concentric with the seal O.D.

It is therefore an object of the present invention to provide an improved method for manufacturing a seal having a polytetrafluoroethylene sealing lip, which method eliminates any post-molding operations and provides a more economical method for producing an improved seal.

SUMMARY OF THE PRESENT INVENTION

A method for manufacturing a shaft seal of the type having a polytetrafluoroethylene sealing lip comprising placing a metal shell (if desired), a synthetic rubber blank prep form and a sintered polytetrafluoroethylene washer in a mold and then closing the mold to simultaneously form (or die-form) the polytetrafluoroethylene sealing lip, mold this elastomer into the desired shape and bond the anchor portion of the polytetrafluoroethylene sealing element to the elastomeric body.

BRIEF DESCRIPTION OF THE DRAWINGS

The present invention will be more fully understood be reference to the following detailed description thereof, when read in conjunction with the attached drawings, wherein like reference numerals refer to like elements and wherein.

DETAILED DESCRIPTION OF THE PREFERRED EMBODIMENTS

Figure 1:
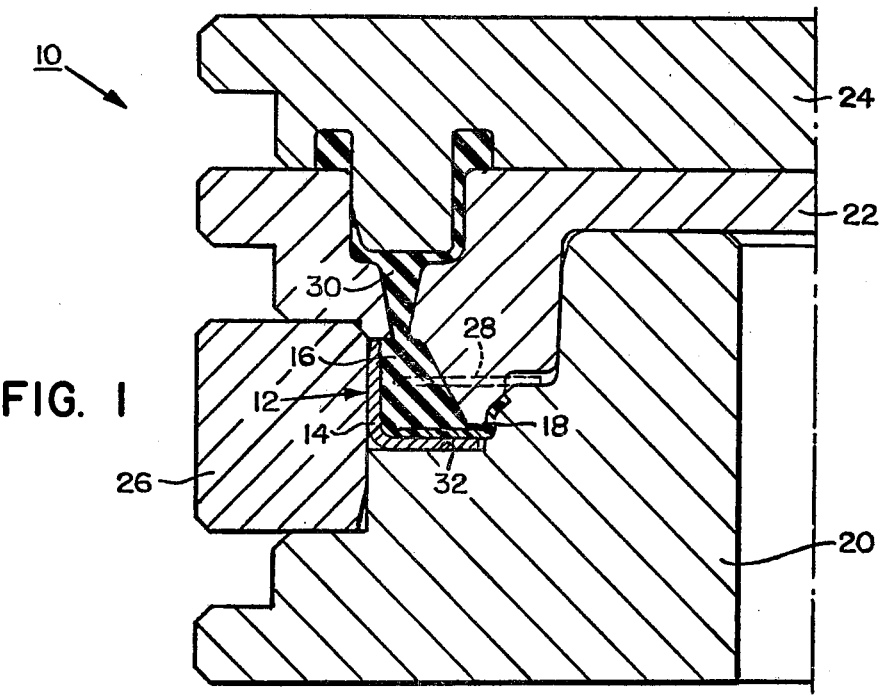
FIGS. 1–4 are each partial cross-sectional views through different molds for manufacturing, according to the present invention, a shaft seal having a formed polytetrafluoroethylene sealing lip.

With reference now to the drawings, FIG. 1 shows a transfer mold 10 for use in making a shaft seal 12 of the type having a metal shell 14, an annular ring 16 of elastomeric material, such as synthetic rubber, and a flexible, non-elastomeric sealing lip 18 preferably made of polytetrafluoroethylene. In the prior art, a post-molding operation was required in order to form the polytetrafluoroethylene sealing lip 18 into the desired shape. However, according to the present invention, the sealing lip portion of the sealing element 18 is formed into the desired shape at the same time that ring 16 is molded and bonded to the anchor portion of the sealing element 18 and to the metal shell 14. The transfer mold 10 comprises a lower mold cavity section 20, an upper mold cavity section 22, a ram 24, and a center ring 26, all of which mold parts are well-known in the art, including the operation thereof. In making the seal 12, the metal shell 14 is placed in a mold cavity 32 of the mold 10, and then a sintered polytetrafluoroethylene member, preferably in the shape of a flat, annular washer, is placed in the mold, for example, in the position shown by the dotted lines 28. A synthetic rubber blank prep form is then placed in an annular cavity 30 and when the mold is closed to the position shown in FIG. 1, the polytetrafluoroethylene member (28) is formed into a sealing element 18 having the desired shape, as shown, the synthetic rubber is transferred by flowing from the cavity 30 into the mold cavity 32 to produce the annular ring 16, and the annular ring 16 is bonded to the metal shell 14 and to the sealing element 18 all at the same time. This method of manufacture eliminates any post-molding, forming operations and provides a more economical method for producing an improved seal 12. During molding, any excess polytetrafluoroethylene is pinched off, as it also is in the embodiments of FIGS. 2–4. The mold is usually closed for about 3–4 minutes and a temperature of about 360°–400° F. and a pressure of about 16,000–20,000 psi is used in the embodiment shown in FIG. 1, as well as the embodiments shown in FIGS. 2–4.

Figure 2:
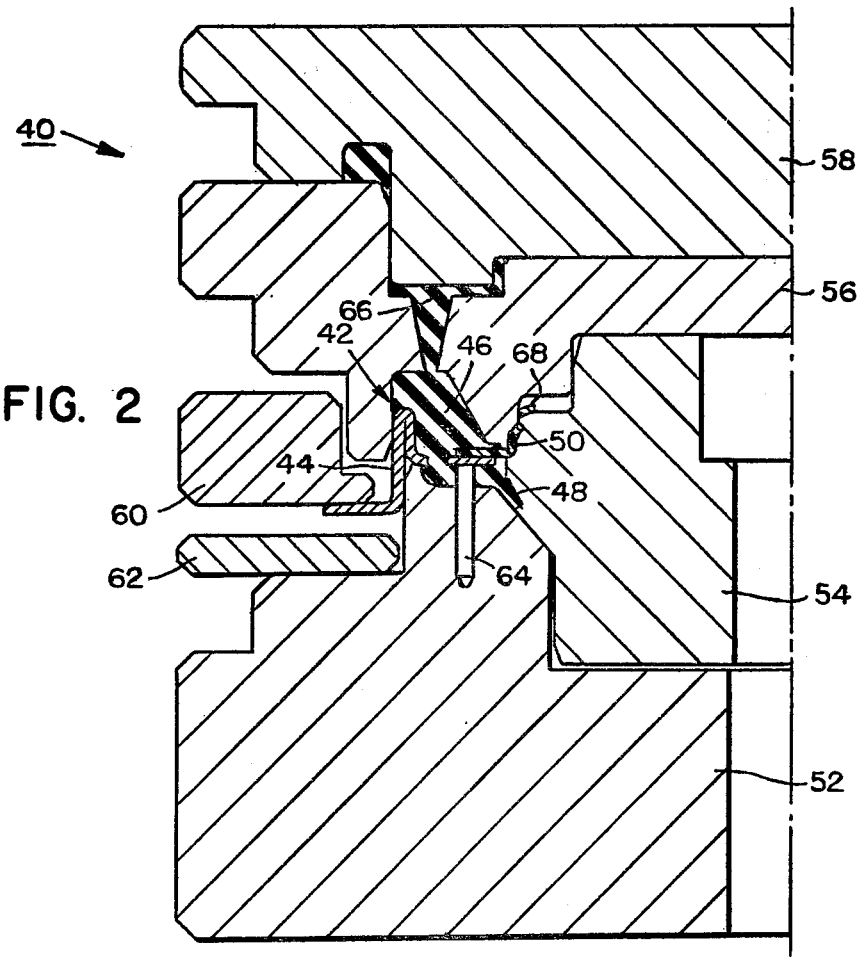

FIG. 2 shows another transfer mold 40 for making a seal 42 of the type having an annular metal shell 44, an annular ring 46 of elastomeric material forming an auxiliary lip 48, and a polytetrafluoroethylene sealing element 50. The mold 40 includes a lower section 52, a core 54, an upper section 56, a ram 58, a pair of stripper rings 60 and 62, and a plurality of support pins 64 for holding a portion of the metal shell 44 in place as the mold is closed, all of which, and the operation of which, are well-known in the art. The seal 42 is made according to the present invention similarly as was described above with respect to FIG. 1, by placing the metal shell 44 in the mold, placing in the mold a flat, annular polytetrafluoroethylene washer (as shown in FIG. 1 at 28) to form the sealing element 50, and placing a synthetic rubber blank prep form in a cavity 66, and then closing the mold 40 to bond the annular rubber ring 46, the metal shell 44 and the sealing element 50 together while simultaneously molding the ring 46 and forming the sealing lip portion of the sealing element 50 in their desired shapes, with any excess polytetrafluoroethylene pinched off as shown at 68.

Figure 3:
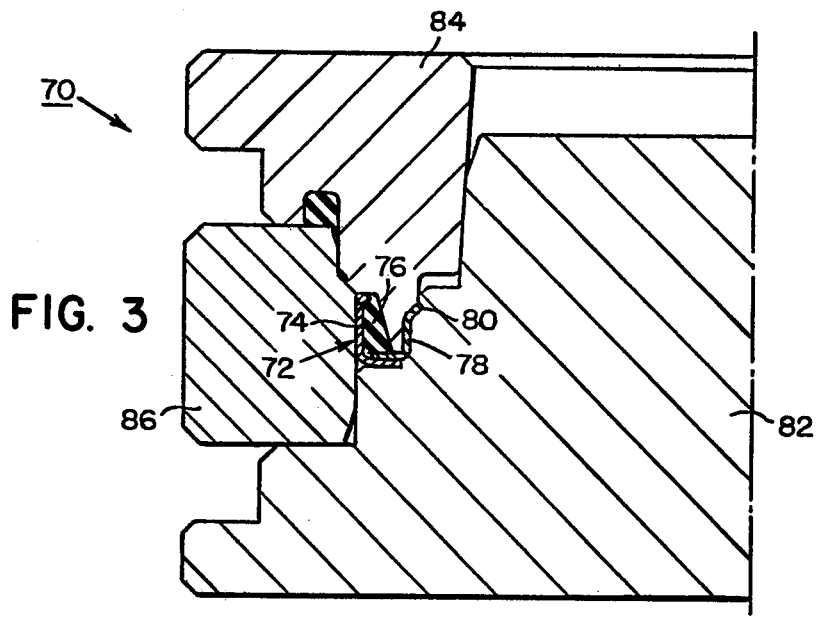

FIG. 3, shows a compression mold 70 for use in producing a seal 72 of the type having a metal shell 74, an annular ring 76 of elastomeric material and an annular polytetrafluoroethylene sealing element 78 having a sealing lip 80. The mold 70 includes a lower mold cavity section 82, an upper mold cavity section 84 and a center ring 86. According to the process of the present invention, the shell 74, a flat, annular polytetrafluoroethylene washer and an annular synthetic rubber blank prep form are placed in the mold and then the mold is closed, simultaneously bonding the parts of the seal together while molding the ring 76 and forming the polytetrafluoroethylene sealing element 78 in its desired shape as shown in FIG. 3.

Figure 4:
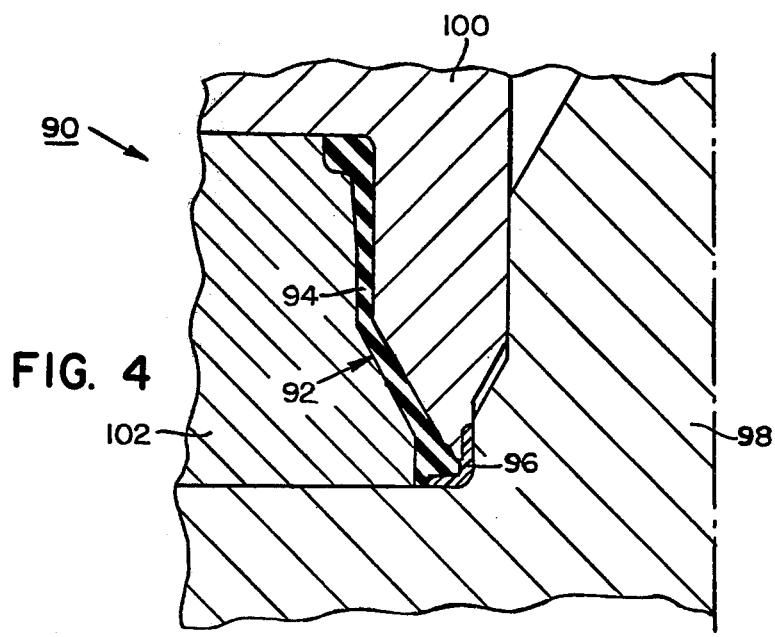

FIG. 4 shows another embodiment of the present invention of a compression mold 90 for making a seal 92 of the type including an annular, elongated elastomeric sleeve 94 having a polytetrafluoroethylene sealing lip 96 bonded to one end thereof. The mold 90 includes a lower mold cavity section 98, an upper mold cavity section 100 and a center ring 102. An annular synthetic rubber blank prep form is placed in the mold along with a polytetrafluoroethylene member in the shape of a flat washer. Upon closing the mold, the elastomeric sleeve 94 is molded and bonded to the polytetrafluoroethylene sealing element 96 and the sealing element 96 is simultaneously formed into the desired shape, with any excess polytetrafluoroethylene being pinched off.

In each of the embodiments described above it is noted that the flexible, non-elastomeric sealing element has a holding or anchoring portion (the flat portion bonded between the shell and the elastomeric body) and a formed sealing lip portion.

This invention has been described in detail with particular reference to preferred embodiments thereof, but it will be understood that variations and modifications can be effected within the spirit and scope of the invention as described hereinabove and as defined in the appended claims. For example, the exact nature such as the shape and material of the metal shells (when used), the shape and nature of the annular elastomeric rings and the shape of the polytetrafluoroethylene sealing elements and their sealing lips need not be identically as shown in the various embodiments of FIGS. 1–4. Further, while the polytetrafluoroethylene is preferably placed in the molds in each of the above embodiments as a flat washer, as shown in FIG. 1, this is not essential and other shapes, such as a disc or a conical form, can be used. To improve bonding between the synthetic rubber portion of each seal and the polytetrafluoroethylene sealing element, the polytetrafluoroethylene element can be etched as is well-known in the art to provide a large number of small pits for the rubber to flow into to provide mechanical bonding. Also, the metal case can be phosphated and cemented prior to insertion in the mold to enhance the production of the chemical bond as is also well-known in the art. The molds can be hydraulically or mechanically closed, for example.

What is claimed is:

1. A method for making, by transfer molding, an annular shaft seal of the type including an annular ring molded from synthetic rubber and a polytetrafluoroethylene sealing element including a radial anchor portion connected to said ring and a frustoconical sealing lip spaced-away from said ring, said method comprising:
   (a) providing a transfer mold including lower mold cavity section and a separate, relatively movable upper mold cavity section, said lower and upper sections defining a mold cavity therebetween, said upper mold cavity section having an upper recess for receiving a blank prep form of synthetic rubber and an opening communicating between said recess and said cavity, and a movable ram located above said upper mold cavity section for causing synthetic rubber to flow from said recess into said cavity;
   (b) inserting a sintered polytetrafluoroethylene member into said mold cavity;
   (c) inserting a synthetic rubber blank prep into said recess; and
   (d) closing the mold to simultaneously move both said upper mold cavity section, said ram, and said lower section toward each other, said upper section contacting said polytetrafluoroethylene member and forming a portion of said polytetrafluoroethylene member between said upper section and said lower section into a polytetrafluoroethylene sealing element having a radial anchor portion and a substantially homogeneous, formed, frustoconical sealing lip, and said ram contacting said blank prep form between said ram and said upper section and flowing said blank prep form into said cavity on top of and into contact with said anchor portion of said polytetrafluoroethylene sealing element to mold said blank prep form into an annular synthetic rubber ring in contact with said anchor portion and spaced away from and out of contact with said sealing lip, and
   (e) bonding said molded ring to said anchor portion only of said polytetrafluoroethylene sealing element.

2. The method according to claim 1 including the steps of holding the mold closed for a time in the range of about three to four minutes at a temperature in the range of about 360° to 400° F. and at a pressure in the range of about 16,000 to 20,000 psi.

3. The method according to claim 1 wherein said inserting step comprises inserting said member into said mold in the shape of a flat, annular washer.

4. The method according to claim 1 wherein said shaft seal includes an annular metal case and including the step of inserting said annular metal case in said mold prior to closing said mold and wherein said bonding step also includes bonding said elastomeric ring to said metal case.

5. The method according to claim 1 wherein the mold closing step includes the step of cutting off any excess material from said sealing lip.

6. The method according to claim 5 including the steps of holding the mold closed for a time in the range of about three to four minutes at a temperature in the range of about 360° to 400° F. and at a pressure in the range of about 16,000 to 20,000 psi.

7. The method according to claim 6 wherein said inserting step comprises inserting said member into said mold in the shape of a flat, annular washer.

8. The method according to claim 7 wherein said shaft seal includes an annular metal case and including the step of inserting said annular metal case in said mold prior to closing said mold and wherein said bonding step also includes bonding said elastomeric ring to said metal case.

9. A method for making an annular shaft seal of the type including an annular elastomeric body and an annular, flexible, non-elastomeric sealing element having a radial anchor portion and having a frustoconical sealing lip, with said elastomeric body being bonded to said anchor portion and being spaced away from and out of contact with said sealing lip, said method comprising:
   (a) inserting a flexible, non-elastomeric member and a blank prep form of elastomer in a mold,
   (b) closing said mold, simultaneously forming said member into a sealing element having a radial anchor portion and a substantially homogeneous, die-formed, frustoconical, sealing lip and flowing said blank prep form of elastomer into an annular elastomeric body spaced away from and out of contact with said sealing lip and in contact with said anchor portion, and
   (c) bonding said elastomeric body to said radial anchor portion only of said sealing element.

10. The method according to claim 9 wherein said inserting step comprises inserting said member into said mold in the shape of a flat, annular washer.

11. The method according to claim 9 wherein said sealing element comprises a plastic resin.

12. The method according to claim 11 wherein said sealing element is sintered polytetrafluoroethylene.

13. The method according to claim 12 wherein said inserting step comprises inserting said member into said mold in the shape of a flat annular washer.

14. The method according to claim 13 wherein said shaft seal includes an annular metal case and including the step of inserting said annular metal case in said mold prior to closing said mold and wherein said bonding step also includes bonding said elastomeric body to said metal case.

15. The method according to claim 14 including the steps of holding the mold closed for a time in the range of about three to four minutes at a temperature in the range of about 360° to 400° F. and at a pressure in the range of about 16,000 to 20,000 psi.

16. The method according to claim 15 wherein the mold closing step includes the step of cutting off any excess material from said flexible non-elastomeric member at the distal end of the sealing lip portion thereof.

17. The method according to claim 9 including the steps of holding the mold closed for a time in the range of about three to four minutes at a temperature in the range of about 360° to 400° F. and at a pressure in the range of about 16,000 to 20,000 psi.

18. The method according to claim 9 wherein the mold closing step includes the step of cutting off any excess material from said flexible non-elastomeric member at the distal end of the sealing lip portion thereof.

19. The method according to claim 9 wherein said shaft seal includes an annular metal case and including the step of inserting said annular metal case in said mold prior to closing said mold and wherein said bonding step also includes bonding said elastomeric body to said metal case.

20. The method according to claim 9 wherein said inserting step includes inserting said member and prep form into a transfer mold.

21. The method according to claim 9 wherein said inserting step includes inserting said member and prep form into a compression mold.

22. A method for making, by compression molding, an annular shaft seal of the type including an annular ring molded from synthetic rubber and a polytetrafluoroethylene sealing element including a radial anchor portion connected to said ring and a frustoconical sealing lip spaced-away from said ring, said method comprising:
 (a) providing a compression mold including a lower mold cavity section and an upper mold cavity section, all defining a mold cavity therebetween,
 (b) inserting a sintered polytetrafluoroethylene member into said mold cavity;
 (c) inserting a synthetic rubber blank prep form into said cavity on top of said member, and
 (d) closing the mold to simultaneously move said upper mold cavity section and said lower section toward each other, said upper section contacting said member and forming a portion of said polytetrafluoroethylene member between said upper section and said lower section into a polytetrafluoroethylene sealing element having a radial anchor portion and a substantially homogeneous, formed, frustoconical sealing lip, and said upper portion also contacting said blank prep form and molding it between said upper and lower sections into an annular synthetic rubber ring on top of and in contact with said anchor portion of said polytetrafluoroethylene sealing element and spaced away from and out of contact with said sealing lip, and
 (e) bonding said molded ring to said anchor portion only of said polytetrafluoroethylene sealing element.

23. The method according to claim 22 including the steps of holding the mold closed for a time in the range of about three to four minutes at a temperature in the range of about 360° to 400° F. and at a pressure in the range of about 16,000 to 20,000 psi.

24. The method according to claim 22 wherein said inserting step comprises inserting said member into said mold in the shape of a flat, annular washer.

25. The method according to claim 22 wherein said shaft seal includes an annular metal case and including the step of inserting said annular metal case in said mold prior to closing said mold and wherein said bonding step also includes bonding said elastomeric ring to said metal case.

26. The method according to claim 22 wherein the mold closing step includes the step of cutting off any excess material from said sealing lip.

27. The method according to claim 26 including the steps of holding the mold closed for a time in the range of about three to four minutes at a temperature in the range of about 360° to 400° F. and at a pressure in the range of about 16,000 to 20,000 psi.

28. The method according to claim 27 wherein said inserting step comprises inserting said member into said mold in the shape of a flat, annular washer.

29. The method according to claim 28 wherein said shaft seal includes an annular metal case and including the step of inserting said annular metal case in said mold prior to closing said mold and wherein said bonding step also includes bonding said elastomeric ring to said metal case.

30. A method for making, by transfer molding, an annular shaft seal of the type including an annular ring molded from synthetic rubber and a polytetrafluoroethylene sealing element including a radial anchor portion connected to said ring and a frustoconical sealing lip spaced-away from said ring, said method comprising:
 (a) providing a transfer mold including a lower mold cavity section, a separate, relatively movable upper mold cavity section and a center ring, said lower and upper sections defining a mold cavity therebetween, said upper mold cavity section having an upper recess for receiving a blank prep form of synthetic rubber and an opening communicating between said recess and said cavity whereby synthetic rubber can flow from said recess into said cavity,
 (b) inserting a sintered polytetrafluoroethylene member into said mold cavity,
 (c) inserting a synthetic rubber blank prep form into said recess, and
 (d) closing the mold to simultaneously move both said upper mold cavity section, said ram, and said lower section toward each other, said upper section contacting said polytetrafluoroethylene member and forming a portion of said polytetrafluoroethylene member between said upper section and said lower section into a polytetrafluoroethylene sealing element having a radial anchor portion and a substantially homogeneous, formed, frustoconical sealing lip, and said ram contacting said blank prep form between said ram and said upper section and flowing said blank prep form into said cavity on top of and into contact with said anchor portion of said polytetrafluoroethylene sealing element to mold said blank prep form into an annular synthetic rubber ring in contact with said anchor portion and spaced away from and out of contact with said sealing lip, and (e) bonding said molded ring to said anchor portion only of said polytetrafluoroethylene sealing element.

31. A method for making, by compression molding, an annular shaft seal of the type including an annular ring molded from synthetic rubber and a polytetrafluoroethylene sealing element including a radial anchor portion connected to said ring and a frustoconical sealing lip spaced-away from said ring, said method comprising:

(a) providing a compression mold including a lower mold cavity section, an upper mold cavity section and a center ring, said lower and upper sections defining a mold cavity therebetween;

(b) inserting a sintered polytetrafluoroethylene member into said mold cavity, (c) inserting a synthetic rubber blank prep form into said recess, (d) closing the mold to simultaneously move said upper mold cavity section and said lower section toward each other, said upper section contacting said member and forming a portion of said polytetrafluoroethylene member between said upper section and said lower section into a polytetrafluoroethylene sealing element having a radial anchor portion and a substantially homogeneous, formed, frustoconical sealing lip, and said upper portion also contacting said blank prep form and molding it between said upper and lower sections into an annular synthetic rubber ring on top of and in contact with said anchor portion of said polytetrafluoroethylene sealing element and spaced away from and out of contact with said sealing lip, and (e) bonding said molded ring to said anchor portion only of said polytetrafluoroethylene sealing element.

* * * * *